Figure 1:
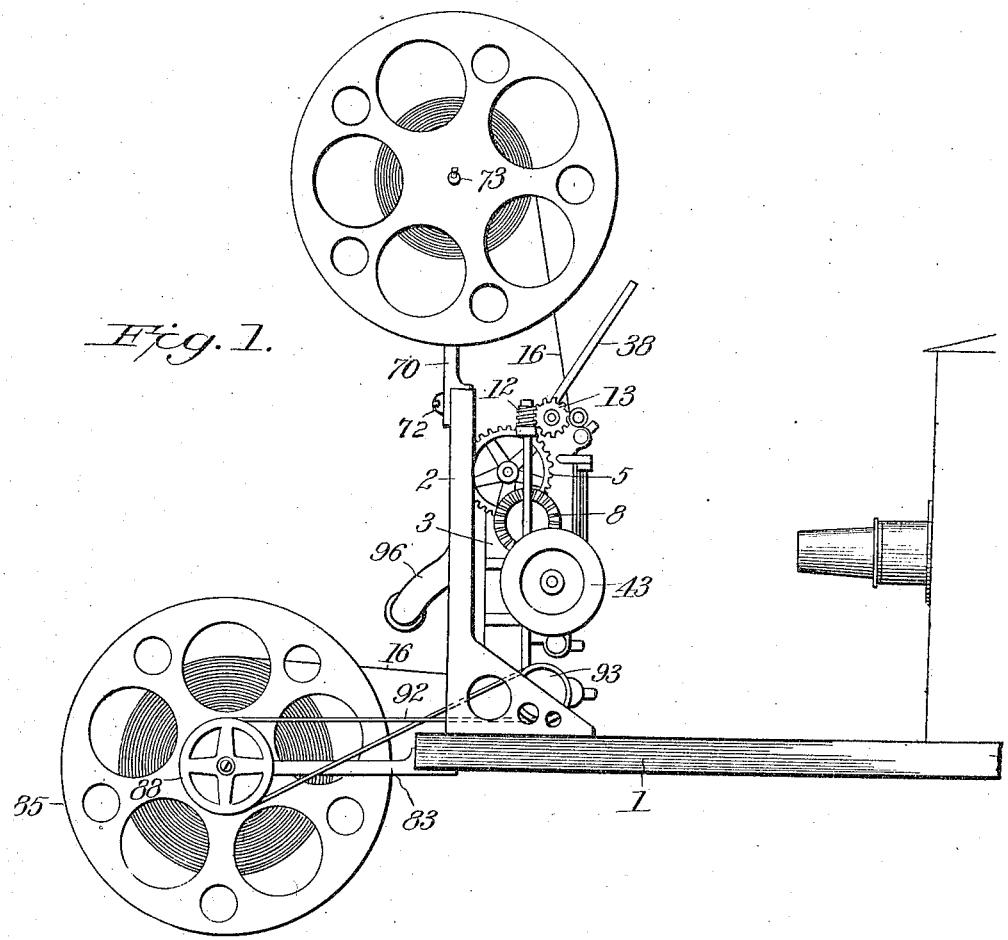

No. 865,106. PATENTED SEPT. 3, 1907.
B. H. KELLER.
KINETOSCOPE.
APPLICATION FILED FEB. 8, 1907.

5 SHEETS—SHEET 1.

Witnesses
Inventor
Boyd H. Keller.
By T. Walter Fowler
his Attorney

No. 865,106. PATENTED SEPT. 3, 1907.
B. H. KELLER.
KINETOSCOPE.
APPLICATION FILED FEB. 8, 1907.

5 SHEETS—SHEET 2.

Witnesses
C. H. Walker
C. W. Fowler

Inventor
Boyd H. Keller.
By J. Walter Fowler
His Attorney

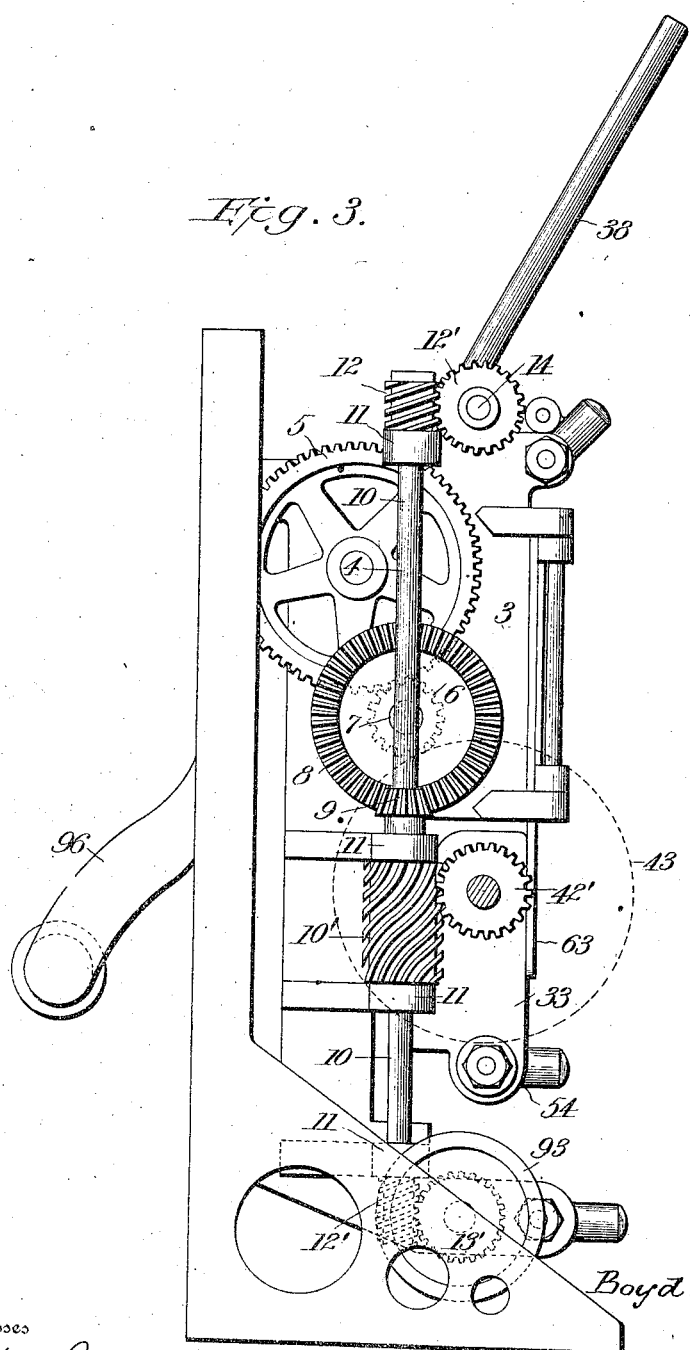

No. 865,106. PATENTED SEPT. 3, 1907.
B. H. KELLER.
KINETOSCOPE.
APPLICATION FILED FEB. 8, 1907.
5 SHEETS—SHEET 4.
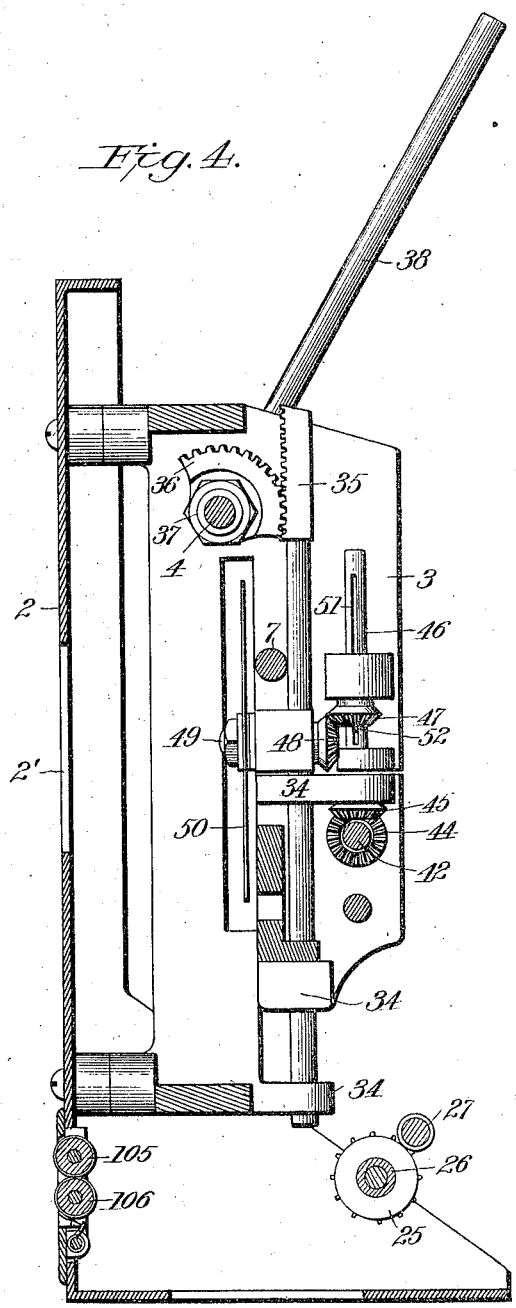
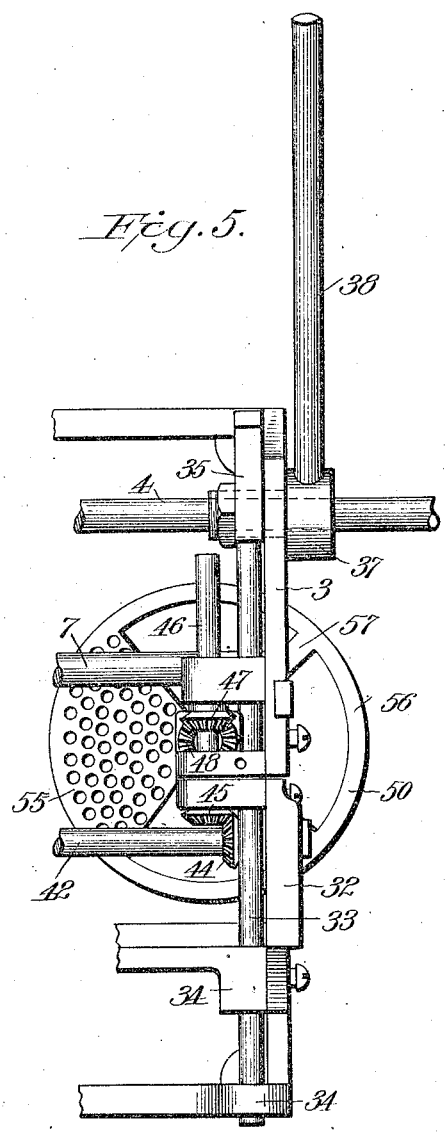
Witnesses
C. H. Walker.
C. W. Fowler
Inventor
Boyd H. Keller.
By T. Walter Fowler
his Attorney No. 865,106.  
B. H. KELLER.  
KINETOSCOPE.  
APPLICATION FILED FEB. 8, 1907.

PATENTED SEPT. 3, 1907.

5 SHEETS—SHEET 5.

Inventor  
Boyd H. Keller.

Witnesses  
By T. Walter Fowler  
his Attorney

UNITED STATES PATENT OFFICE.

BOYD H. KELLER, OF NEW YORK, N. Y.

KINETOSCOPE.

No. 865,106.

Specification of Letters Patent.

Patented Sept. 3, 1907.

Application filed February 8, 1907. Serial No. 356,467.

*To all whom it may concern:*

Be it known that I, BOYD H. KELLER, a citizen of the United States, residing at New York, in the borough of Manhattan, and State of New York, have invented new and useful Improvements in Kinetoscopes, of which the following is a specification.

My invention relates to certain new and useful improvements in kinetoscopes, or machines primarily designed for exhibiting a series of pictures representing successive phases of motion in such manner, rate, and order of succession as to produce the illusion of an animated picture.

My invention belongs to that class of picture-exhibiting machines in which a continuous film is used bearing a series of pictures of successive phases of motion, which pictures are successively brought into view or into the field of a lens and by rays of light are projected upon a screen or other surface, in a manner and by means well known in this art.

The essential objects of the present invention are:— 1st. To provide an improved and simple means for lifting a closure or light cut-off and maintaining the same open during the period the machine is in motion but which closure automatically covers the light aperture when the machine stops from any cause, and thereby protects the now stationary film from the injurious effects of the intense heat to which it would otherwise be subjected. 2nd. To provide improved means, adjustable relative to the fixed portion of the frame, in which is mounted the rotary shutter, whereby the picture may be centered relative to the light aperture. 3rd. To provide an improved rotary shutter with radial arms and a solid segment with perforations so arranged that the usual objectionable flickering effect upon the canvas or screen is nearly, if not quite entirely overcome. 4th. In providing the pressure rolls for the film with spring means for positively holding the rolls in contact, or out of contact with the film. 5th. To provide an improved form of spiral gearing for transmitting motion to the several parts of the machine. 6th. In providing the reels for the film with a spring latch adapted to engage the reels to hold the latter in place.

With these and other objects in view, my invention consists of the parts and the constructions and combinations of parts which I will hereinafter describe and claim.

Figure 9:
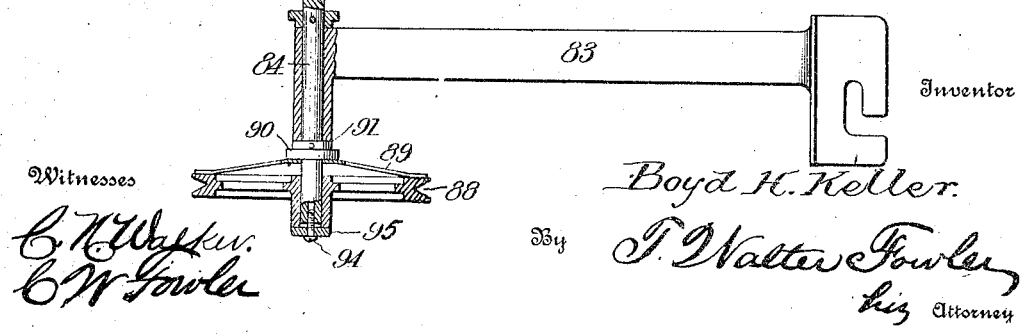
Figure 2:
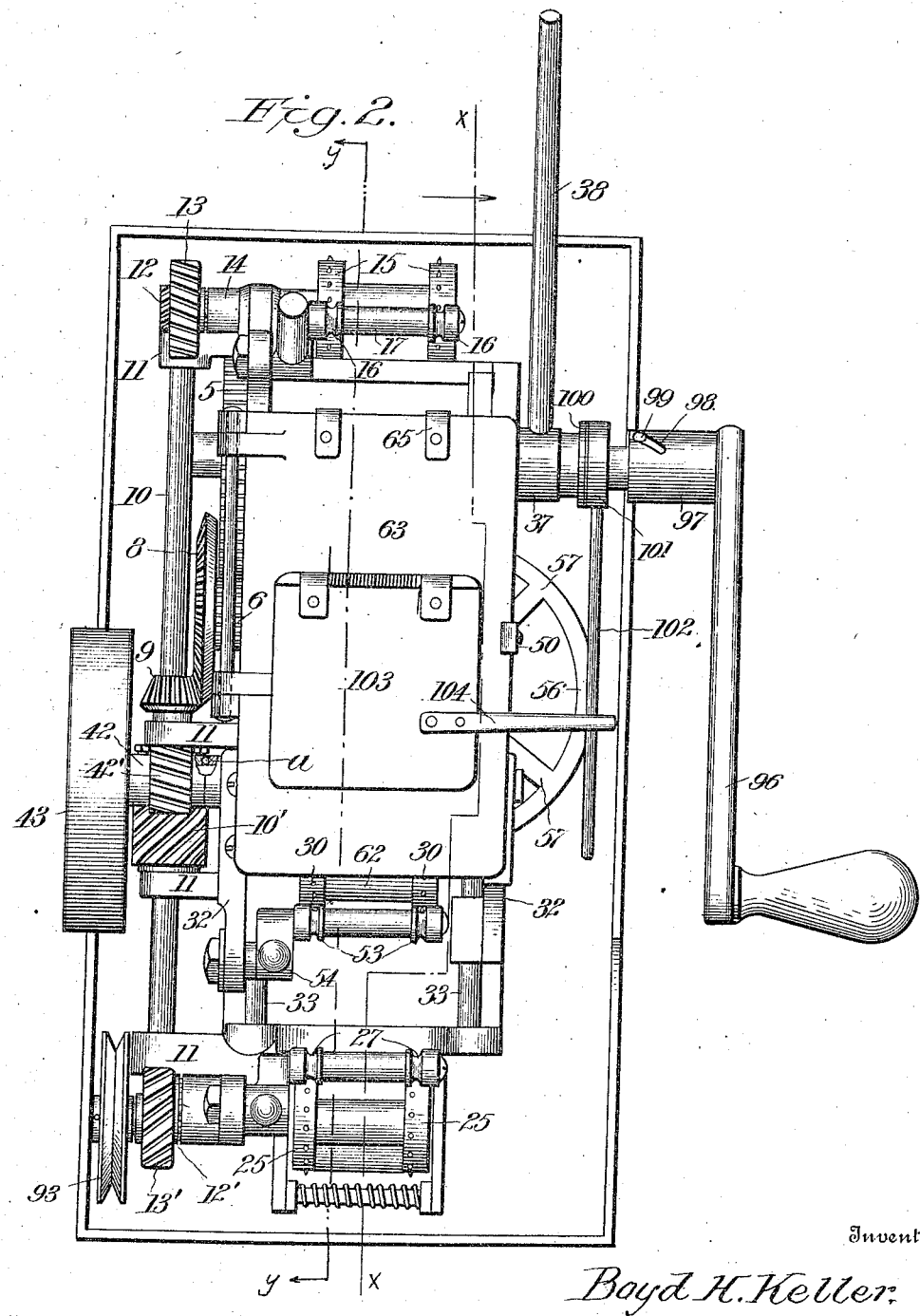
Figure 6:
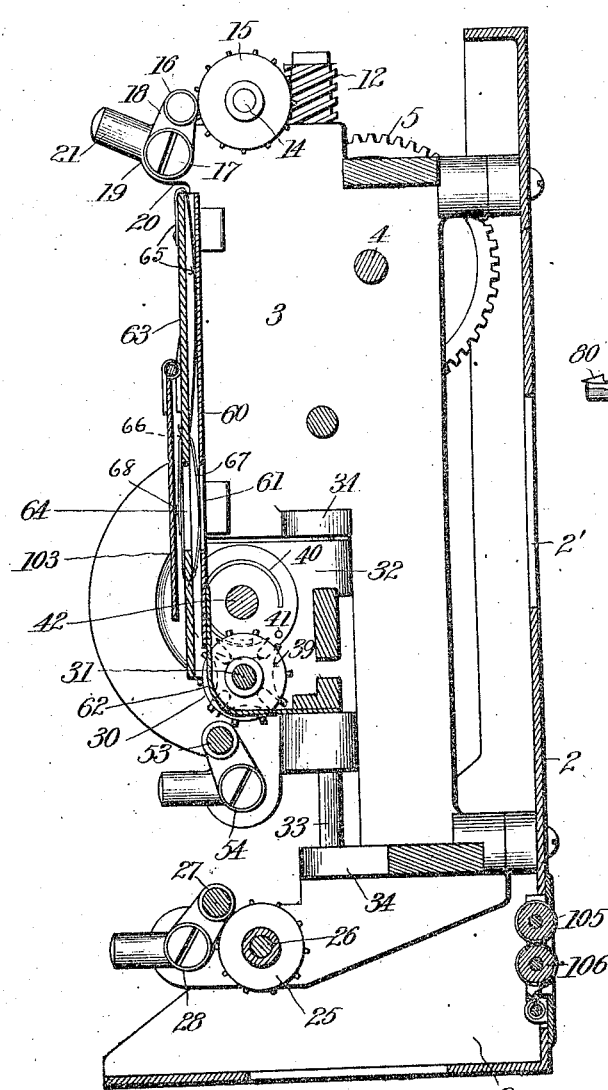
Figure 7:
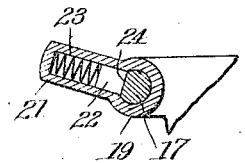
Figure 8:
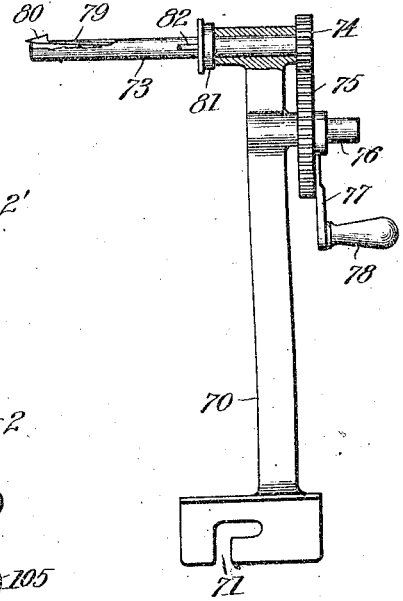

In the accompanying drawings forming part of this specification and in which similar reference characters indicate like parts in the several views:—Figure 1, is a side elevation of a kinetoscope or like machine embodying my invention. Fig. 2, is a front elevation on an enlarged scale of the film feeding and projecting portion of the apparatus, showing the spools omitted. Fig. 3, is an elevation of one side of the machine of Fig. 2. Fig. 4, is a vertical sectional view on the line $x$—$x$ of Fig. 2. Fig. 5, is a detail showing a front view of the right hand portion of Fig. 2 with the front plate removed. Fig. 6, is a vertical sectional view on the line $y$—$y$ of Fig. 2 looking in the direction of the arrows. Fig. 7, is a sectional view of one of locking springs for the pressure rolls. Fig. 8, is a detail of one of the spool-supporting brackets, showing the re-winding mechanisms. Fig. 9, is a plan view, partially in section, of the lower spool-supporting bracket showing the friction clutch therefor.

In carrying out my invention I prefer to follow the recognized course of constructing the picture-exhibiting machine of two coacting though independent parts, namely, the picture feeding and projecting apparatus proper, and the lamp or other source of light.

The picture-feeding and projecting part of the apparatus, and it is to this part that my improvements primarily relate, is fixed to a suitable base 1.

Referring now to Figs. 1 to 5 inclusive it will be seen that the usual standard 2 is fixed to the base in any approved manner and contains the usual aperture 2' through which the picture is projected. The standard has rigidly fixed to it the frame 3 in which the rotary shutter and the gearing and other operative parts of the machine are mounted, as I will hereinafter describe.

Across the upper portion of the standard 2 is journaled the shaft 4 through which and suitable gearing, hereinafter described, motion is transmitted to the rotary shutter and other parts, said shaft having fixed to one end a gear-wheel 5 which meshes with a pinion 6, fixed to a transverse-shaft 7 journaled in the sides of the frame 3. On the shaft 7 just outside of the pinion 6 is also fixed a bevel gear wheel 8 which meshes with a bevel pinion 9 fixed to a vertical shaft 10 journaled in bearings 11 at the upper and lower and intermediate parts at one side of the fixed frame 3, said vertical shaft 10 having worms 12 12' fixed to its opposite ends, one of said worms, 12 meshing with a worm gear 13 and the other worm meshing with a worm gear 13'. These worms and worm gears operate the upper and lower film-feeding devices. The upper film feeding device comprises the usual shaft 14 and the two sprockets 15, the teeth of which are designed to engage the usual perforations, not shown, formed in the film 16 near the edges thereof. The film passes downward from its supply spool, which I will hereinafter describe, and beneath the sprockets 15, with which it is held in engagement by the pair of grooved rollers 16 mounted on a short shaft 17, projecting from an arm 18 of a rocking lever 19, journaled in a bracket 20 projecting from the frame 3, said lever having a projecting member 21 which serves as a handle by which it may be operated.

The grooved rollers 16 are held normally in contact with the film by means of a spring means which in the present instance, Fig. 7, includes a block 22 slidably mounted in the hollow lever 21 and backed by a spring 23, said block adapted to press against a flattened surface 24 on the shaft 17, to hold the lever 19 with the rollers 16 pressing against the film; when the lever is turned backwardly the block 22 yields to allow it to ride off the flattened portion of the shaft.

The lower film-feeding devices include the pair of sprockets 25 carried by the shaft 26 which turns in bearings provided for it on the lower portion of the stationary frame 3, a pair of grooved rollers 27 holding the film in contact with said sprockets and being moved toward and from the sprockets by means of a rocking lever 28 similar to lever 19, and the rollers being held normally in contact with the said film by a spring mechanism similar to that shown in Fig. 7, and before described.

The upper and lower film-feeding devices are designed to have a continuous motion and they operate in conjunction with an intermediate film-feeding mechanism which has an intermittent motion. This intermediate film-feeding mechanism comprises a pair of sprocket wheels 30 mounted on a transverse shaft 31 whose ends are journaled in the sides of a carriage 32 which is adapted to be vertically adjusted relative to the fixed shutter-carrying frame 3, in or upon the lower portion of which said carriage is movably mounted by means of vertical rods 33, fixed to said carriage and projecting above and below the same and slidably fitting bearings 34 in the fixed frame 3.

The carriage has fixed to it a vertical rack-bar 35 which extends up along the inside of the fixed frame 3, and the teeth of this rack-bar are engaged by a toothed segment 36 fixed to a sleeve 37 turnably, but snugly, fitting the main shaft 4, said sleeve having a rod or lever 38 fixed to its outer end by which the sleeve and its segment may be turned to operate the rack bar and raise and lower the carriage relative to the fixed frame, which latter carries the rotary shutter.

To enable the carriage 32 to be adjusted i. e. raised or lowered relative to the rotary shutter and without stopping the operation of the machine, I provide the vertical shaft 10 with a long spiral-gear 10′, and I fix to the shaft 42 a spiral-gear 42′ which meshes with the gear 10′ and is adapted to move up and down on the gear 10′ when the carriage is raised and lowered, without disturbing the operative engagement of these gears. Also, if desired and to facilitate the easy running of the spiral-gear 42′, I may supply said gear with a ball-bearing, as shown; in fact such bearings may be supplied for any of the gears and other parts, if desired.

The intermediate film-feeding devices are designed to have an intermittent motion and this is effected by means of an ordinary Geneva stop-wheel 39 mounted on the shaft of the sprocket wheels 30, and a driving-wheel 40 bearing a single stud 41 for engagement with said stop-wheel. The driving-wheel and stop-wheel are of well known construction and operation, said driving-wheel being fixed to a shaft 42 which turns in suitable bearings in the carriage, said shaft carrying the usual fly-wheel 43 at one end and having a bevel-gear wheel 44 fixed to its opposite end just inside of the carriage, which bevel-gear is designed to mesh with a similar gear-wheel 45 fixed to the lower end of a short vertical shaft 46 journaled on the carriage, said shaft having loose thereon a bevel-gear wheel 47 which meshes with a similar gear-wheel 48 on a shaft 49 arranged at right angles to the vertical shaft and having secured to it the rotary shutter 50.

To enable the vertical shaft 46 and carriage to be moved vertically without disturbing the fixed relation of the shutter to the light aperture, in orther words to allow the carriage to be raised and lowered relative to the shutter for the purpose of centering the picture in the projection aperture, I form a groove or key-way 51 in the vertical shaft and provide the bevel-gear with a spline or key 52 to engage said key-way and thus allow the shaft to slide freely through the gear 47 without disturbing its relation to the companion gear 48.

In addition to the foregoing, the intermediate film-feeding devices include the grooved-wheels 53 adapted to maintain the film against the sprocket-wheels 30, and the rocking lever 54 which will be provided with a spring means the arrangement and operation of which are the same as before described for corresponding parts of the upper and lower film-feeding devices.

The rotary shutter 50 is in the form of a disk out of which is cut a plurality of segments, leaving one segment 55 practically uncut and rigid with the rim 56, and the radial arms or spokes 57. The solid segment of the shutter I prefer to supply with numerous closely-arranged perforations which in conjunction with the radial arms of said shutter appear in practice to greatly reduce the variations in the light thrown upon the screen during the operation of the apparatus, thereby eliminating much of the eye-strain and flickering which is ordinarily experienced by spectators viewing moving pictures. By leaving in the shutter such solid portions as the segment 55 and the radial arms, and perforating the said segment with numerous small holes, the flickering effect of the light is reduced by reducing the brilliancy of the illumination on the screen and by increasing the frequency of changes in the illumination upon the screen. By lessening the brilliancy of the display on the screen, the contrast between the appearance of the screen when the light is cut-off and when the picture is displayed thereon is lessened and by increasing the frequency in the changes of the illumination on the screen the impressions on the retina are diminished in intensity and persistence.

The shutter operates transversely across the field of light projected by the lens, and said shutter and the film have a rapid movement to produce on the eye of the spectator the impression of movement of the people or objects in the screens exhibited, in the manner well known in this class of machines.

The stationary frame 3 has a rear plate 60 which is usually channeled and through this channel the film travels, passing across the usual projection-aperture 61 formed in said plate, the movable carriage 32 having a plate 62 between the sprocket-wheels 30 thereof which slides in contact with a corresponding portion of the rear plate 60; it is with reference to this fixed plate 60 that the carriage is movable because there is a decided advantage in keeping the projection-aperture 61 and rotary shutter stationary and shifting the film relative thereto, as any movement of the projection-aperture changes the position of the sight on the screen and in shifting the film which I can readily do with my carriage the picture is more quickly and satisfactorily centered relative to said aperture and the shutter; a simple movement of the rod or lever 38 through the connections before described, will readily move the carriage with the intermediate film-feeding devices up or down as occasion requires.

At the back of the stationary frame 3 one edge of a horizontally-swinging plate or shutter 63 is hinged, said plate or shutter adapted to close over that portion of the film which is passing over the plate 60 and projection-aperture 61. The swinging plate or shutter 63 has the usual aperture 64 which registers with the aperture 61, and on the inner face of this plate or shutter are flat-springs 65 which frictionally press the edges of the film in contact with the plate 63.

The springs 65 are flat pieces of metal secured at one end to the outside of the shutter 63 just below the top edge thereof, said spring plates thence passing over the top edge of the door and down along the inside of said shutter, and being slightly lowered, and having their lower ends turned outward and loosely passing through openings 66 formed through the door adjacent to the aperture therethrough. The springs 67 are arranged at opposite sides of the aperture 64. They are continuous strips whose opposite ends are passed outwardly through openings in the door, said ends being thence brought together and made to overlap and being secured to the door by a suitable fastening 68.

At the upper end of the standard 2 the upper spool-supporting means are disposed, said means including a vertical bracket 70 having a bayonet slot 71 adapted to receive a set-screw 72 which secures the bracket to the standard 2 or fixed part of the apparatus. In the upper end of the bracket 70 is journaled a shaft 73 carrying a pinion 74 which meshes with a gear-wheel 75 on a stub-shaft 76 projecting from the bracket, said gear having a lever-arm 77 fixed to it and provided with a handle 78 for operating said gear and through it and the pinion operating the spool-shaft. The spool-shaft has fixed to it one end of a longitudinally-extending spring-plate 79 whose free end is formed or provided with a latch-member 80 adapted to automatically engage an appropriate catch, as the edge of the shaft opening in the spool, when said spool is placed upon the shaft, thereby locking the spool to the shaft. A depression of the spring plate 79 to disengage its latch 80 from the catch member of the spool, enables the spool to be easily removed when desired. The spool-shaft carries a washer 81 against which the spool abuts, and said shaft has a spline or key 82 which enters a key-way in the spool to lock the spool to the shaft.

To the underside of the base plate 1 is secured the horizontal bracket 83 the construction of which is substantially like that of the upper bracket 70; in the outer end of this horizontal arm 83 is journaled the shaft 84 for the lower spool 85, said shaft having the spring-plate 86 with latch 87 for engaging the spool, as above explained.

The lower spool-shaft carries a pulley 88 against the inner face of which presses the spring arms 89 of a hub or sleeve 90 fitting said shaft and backing against a collar 91 thereon. The spring arms 89 bear against the pulley 88 with sufficient friction to form therewith a clutch to maintain the proper tension on the film which is being wound on the spool, said friction pulley being connected by a band 92 with a pulley 93 on the shaft 26 of the lower film-feeding devices. Should the speed of the friction pulley 88 at any time become greater than is required for the proper winding of the film, and sufficient to overcome the friction of the spring arms 89 against the pulley, said pulley, which is loose on the spool-shaft, will slip relative to the arms and thus relieve the tension on the film. The tension of the spring arms may be varied at pleasure by an adjusting screw 94 at the end of the shaft engaging a washer or plate 95 bearing against the hub of the pulley.

Various means may be used for operating the main shaft 4. As shown for present purposes, one means consists of a crank-handle 96 whose hub portion 97 has a socket to receive the end of the said shaft, said hub portion being formed with an incline slot 98 adapted to receive and interlock with a pin 99 fixed to said shaft whereby the crank-handle and shaft are rigidly connected and the shaft is capable of being rotated at a high speed. On the main shaft is also a fixed friction washer 100 and a loose sleeve 101, from which latter projects a rod 102, said sleeve being frictionally pressed against the washer by the hub of the crank-handle when said handle is in operation, to turn the sleeve on the shaft and elevate the rod 102, but as soon as inward pressure upon the crank-handle is removed, the weight of the rod 102 causes said rod to descend by gravity and assume substantially a vertical position. This rod 102 is for the purpose of operating a closure or light cut-off, which consists of an imperforate plate 103 hinged at its upper edge to the swinging shutter 63 and being lightly spring-pressed, if desired. The plate 103 has an arm 104 which projects outwardly into the range of action of the aforesaid rod 102, whereby when the crank-handle is operated the rod 102 is lifted and it in turn engages the arm 104 and elevates the closure or cut-off 103 and maintains the latter elevated during the period the crank-handle is in operation; if at any time or for any reason the operation of the crank-handle should cease, the friction between the hub of the handle and the loose sleeve 101 will be destroyed and the sleeve being now free to turn relative to the handle, the rod 102 will drop thereby releasing the closure or cut-off 103 and causing it to close over the light-aperture 64 and thus shut off the light through said aperture and prevent the heat from destroying or injuring the now stationary film.

In the lower part of the standard 2, are guide rollers 105, 106 for the film, one of these rollers, 106, being spring-pressed to impart the desired tension to the film as it is being fed to the winding roller, and when unwinding and rewinding on the upper spool.

Having thus fully described my said invention what I claim as new and desire to secure by Letters Patent, is:—

1. In apparatus of the character described, the combination with the stationary portion of the frame having an aperture through which the picture is projected, and a rotary shutter mounted on said stationary frame, of a carriage adjustable relative to said frame and to the shutter, and provided with film-feeding devices, means for operating the film-feeding devices, said means including a long spiral gear on the frame and a spiral gear on the carriage movable vertically over the first-named gear when the carriage is being adjusted, and means for adjusting the carriage to center the picture relative to the projection-aperture of the stationary frame and to the shutter.

2. In apparatus of the character described, the combination with the stationary portion of the frame, having a projection aperture, and the rotary shutter mounted in said frame, of a carriage slidable on the frame and vertically adjustable relative to the projection-aperture thereof, and to the shutter, film-feeding devices on said carriage, means for operating the film-feeding devices, said means including a long spiral gear on the frame and a spiral gear on the carriage movable vertically over the first-named gear when the carriage is being adjusted, and means permitting the carriage to be adjusted during the movement of the film and without stopping the machine.

3. In apparatus of the character described, the combination with the stationary part of the frame, having a projection-aperture, and a rotary shutter mounted in said frame, of a carriage separate from the frame and slidably guided thereon, film-feeding devices mounted on the carriage, means for operating the film-feeding devices, said means including a long spiral gear on the frame and a spiral gear on the carriage movable vertically over the first-named gear when the carriage is being adjusted, and means for raising and lowering the carriage and its film-feeding devices relative to said shutter and to the projection-aperture of the fixed frame, said means including a rack-bar connected to the carriage and an oscillating toothed segment engaging said bar.

4. In apparatus of the character described, the combination with the stationary portion of the frame, having a projection-aperture, and a rotary shutter, a main shaft, upper and lower film-feeding devices mounted on the stationary frame, and means for operating said film-feeding devices, of a carriage slidably mounted on the stationary frame and adjustable relative to the projection-aperture thereof and to the shutter, intermittent film-feeding mechanism mounted on the carriage, and means including a fixed vertical shaft having a spiral gear and a spiral gear on the carriage for operating the film-feeding devices thereof, said last-named gear having, also, a slidable movement on the gear of the fixed shaft to enable the carriage to be raised and lowered without disarranging the gears or stopping the motion of the apparatus.

5. In apparatus of the character described, the combination with a stationary frame, having a projection-aperture, a main shaft, a rotary shutter mounted in said frame, means for operating the shutter, and upper and lower film-feeding devices mounted on said frame, of a carriage slidably mounted on the frame and adjustable relative to the projection-aperture thereof and to the shutter, intermittent film-feeding devices on the carriage, worm-gearing for operating the upper and lower film-feeding devices, a vertical shaft extending between the upper and lower film-feeding devices having a member of the worm-gearing fixed to its opposite ends, a spiral gear on said vertical shaft intermediate of the ends thereof, and a spiral gear connected to the intermediate film-feeding devices and arranged in mesh with the spiral gear of the vertical shaft and adapted to move over the same when the carriage is raised or lowered.

6. In apparatus of the character described, the combination of a stationary frame having a projection-aperture, a rotary shutter mounted within said frame, a carriage vertically movable relative to the stationary frame and its shutter, upper and lower film-feeding devices on the stationary frame, intermittent film-feeding devices mounted on the carriage, means for operating the upper and lower film-feeding devices, and means for operating the intermittent film-feeding devices said last means including a long spiral-gear mounted to rotate on the stationary frame in unison with the upper and lower film-feeding devices, and a spiral gear mounted on the carriage adapted to travel over said long gear while in operative mesh therewith.

7. In apparatus of the character described, the combination of a stationary frame, a main shaft mounted thereon, a vertical shaft journaled at the side of the frame, upper and lower film-feeding devices mounted on the frame, worm-gearing between the vertical shaft and the upper and lower film-feeding devices, gearing between the main shaft and the vertical shaft, a rotary shutter mounted in the frame, a long spiral gear fixed to the vertical shaft, a carriage slidably mounted relative to the frame and to the rotary shutter, intermittently-operating film-feeding devices mounted on the carriage, a spiral gear for operating the intermittently film-feeding devices, said gear meshing with and adapted to move vertically over the long spiral gear when the carriage is adjusted, and means for adjusting the carriage.

8. In apparatus of the character described, the combination of the stationary frame having a projection-aperture, a rotary shutter mounted in said frame, a carriage vertically shiftable relative to the stationary frame and its shutter said carriage being provided with film-feeding devices, film-feeding devices also mounted on the stationary frame, a main-shaft and connections for operating said film-feeding devices, said connections including a driven shaft mounted on the carriage and intermeshing spiral gears for operating the shaft, and connections between said driven shaft the rotary shutter said last-named connections comprising a vertically slidable, rotatable shaft, gearing between said shaft and the drive shaft, a gear fixed to the shutter, and a gear loose on the vertical shaft and engaging the shutter gear, and a key and key-way connection between the vertical shaft and the loose gear adapted to allow the shaft to be moved vertically with the carriage without disturbing the portion of the rotary shutter.

9. In apparatus of the character described the stationary main frame and the carriage vertically adjustable relative thereto, said main frame having a rotary shutter and a projection-aperture, film-feeding devices on the main-frame and carriage, means for operating the shutter, said last-named means including a vertical shaft fixed to the carriage and slidably guided on the stationary main frame whereby it is raised and lowered with the carriage, a driven-shaft mounted horizontally on the carriage, gearing between the vertical and horizontal shafts, a horizontal shaft for the shutter, a gear fixed to the shutter shaft gear, whereby the carriage with its film-feeding devices may be adjusted relative to the projection aperture of the stationary frame and to the shutter, for centering the picture substantially as described.

10. In apparatus of the character described, the combination with a film-carrying spool, of a shaft therefor, a spring having one end secured to said shaft at a point back of the end thereof, said spring extending along the shaft and having its free end exposed near the outer end of said shaft and provided with an off-set or catch whose wall is arranged substantially at right angles to the axis of the shaft and adapted to engage the edge of the shaft opening in the spool, to hold said spool to the shaft.

In testimony whereof I have hereunto set my hand in presence of two subscribing witnesses.

BOYD H. KELLER.

Witnesses:
AUGUST BLUMRATH,
GUS A. MEYER.